United States Patent
Ke

(10) Patent No.: US 9,729,073 B1
(45) Date of Patent: Aug. 8, 2017

(54) POWER CONVERSION APPARATUS

(71) Applicant: Power Forest Technology Corporation, Hsinchu County (TW)

(72) Inventor: Po-Jen Ke, Taoyuan (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 15/161,300

(22) Filed: May 23, 2016

(30) Foreign Application Priority Data

Feb. 5, 2016 (CN) .......................... 2016 1 0081449
Feb. 5, 2016 (TW) .............................. 105103976 A

(51) Int. Cl.
*H02M 3/335* (2006.01)

(52) U.S. Cl.
CPC ... *H02M 3/33592* (2013.01); *H02M 3/33507* (2013.01)

(58) Field of Classification Search
CPC ......... H02M 3/33576; H02M 3/33592; H02M 3/22; H02M 3/24; H02M 1/4233; H02M 1/4208; H02M 7/219; H02M 7/217; H02M 7/53871; H02M 5/4585; H02M 7/06
USPC ................. 363/15, 21.06, 21.14, 78, 84, 114
See application file for complete search history.

(56) References Cited

U.S. PATENT DOCUMENTS

| | | | | |
|---|---|---|---|---|
| 8,824,167 | B2 * | 9/2014 | Hughes ............. | H02M 3/33507 323/282 |
| 9,293,999 | B1 * | 3/2016 | Lam ................... | H02M 3/33546 |
| 2003/0174525 | A1 * | 9/2003 | Ingman ............. | H02M 3/33592 363/90 |
| 2011/0026275 | A1 * | 2/2011 | Huang .............. | H02M 3/33576 363/21.02 |

(Continued)

FOREIGN PATENT DOCUMENTS

| | | |
|---|---|---|
| TW | I412219 | 10/2013 |
| TW | I451675 | 9/2014 |
| TW | I504113 | 10/2015 |

OTHER PUBLICATIONS

"Office Action of Taiwan Counterpart Application", issued on Sep. 6, 2016, p. 1-p. 3.

*Primary Examiner* — Adolf Berhane
(74) *Attorney, Agent, or Firm* — Jianq Chyun IP Office

(57) ABSTRACT

A power conversion apparatus includes a power conversion circuit, a synchronous rectification transistor, a synchronous rectification control circuit, a feedback circuit, and a cable loss compensation circuit. The power conversion circuit converts an input voltage into an output voltage and provides it to a load. The synchronous rectification transistor is coupled in series to a current path on a secondary side of the power conversion circuit and switched according to a synchronous rectification control signal. The synchronous rectification control circuit generates the synchronous rectification control signal for controlling the switching of the synchronous rectification transistor. The feedback circuit (Continued)

generates an output indication current associated with the output voltage. The cable loss compensation circuit draws a compensation current from the feedback circuit according to the synchronous rectification control signal, so as to compensate for the output voltage based on a sum of the compensation current and the output indication current.

9 Claims, 4 Drawing Sheets

(56) References Cited

U.S. PATENT DOCUMENTS

| | | | |
|---|---|---|---|
| 2014/0376275 A1* | 12/2014 | Ohashi | H02M 1/38 363/21.02 |
| 2015/0301542 A1 | 10/2015 | Yang et al. | |
| 2016/0181927 A1* | 6/2016 | Chang | H02M 1/42 363/21.02 |
| 2016/0254752 A1* | 9/2016 | Wood, III | G06F 1/305 363/15 |
| 2016/0310202 A1* | 10/2016 | Wham | A61B 18/1233 |

* cited by examiner

POWER CONVERSION APPARATUS

CROSS-REFERENCE TO RELATED APPLICATION

This application claims the priority benefits of Taiwan application serial no. 105103976, filed on Feb. 5, 2016 and Chinese application serial no. 201610081449.4, filed on Feb. 5, 2016. The entirety of each of the above-mentioned patent applications is hereby incorporated by reference herein and made a part of this specification.

BACKGROUND OF THE INVENTION

Field of the Invention

The invention relates to a power conversion technology and particularly relates to a power conversion apparatus capable of compensating for cable loss.

Description of Related Art

A power conversion apparatus is mainly used for converting a lowly-stable high input voltage supplied by the power company into a highly-stable low DC output voltage that is suitable for various electronic devices. Therefore, such power conversion apparatus is extensively applied to electronic devices, such as computers, office automation equipment, industrial control equipment, and communication equipment.

When the load end requires a greater power, the power conversion apparatus needs to provide a greater output current for use of the load. An operation state of the power conversion apparatus at this moment is called an overload operation. In the overload operation, the greater output current usually causes a voltage drop on the output line. As a result, the voltage provided to the load end may exceed the specification. This phenomenon is generally called cable loss.

In the current power conversion apparatus, some cable loss compensation mechanisms may be adopted to compensate for the voltage drop of the output voltage caused by cable loss during the overload operation. One of the common cable loss compensation methods is to determine the value of the output current by detecting the length of the turn-off period of a power switch so as to decide the compensation amount for the output voltage; and another is to dispose an output current detection circuit to directly detect the value of the output current so as to decide the compensation amount for the output voltage.

However, when the power conversion apparatus operates in a continuous conduction mode (CCM), the turn-off period is fixed and does not reflect the value of the output current. Therefore, the method of carrying out cable loss compensation according to the turn-off period of the power switch is only applicable to a power conversion apparatus operating in a discontinuous conduction mode (DCM).

On the other hand, the current detection mechanism of the general current detection circuit is to sample the output current and cause the sampled current to pass through a specific resistor, and then determine the value of the sampled current passing through the resistor by measuring the voltage across the resistor, so as to calculate the value of the output current according to the sampled current. Thus, the general output current detection method will cause additional power consumption.

SUMMARY OF THE INVENTION

In view of the above, the invention provides a power conversion apparatus.

The power conversion apparatus of the invention includes a power conversion circuit, a synchronous rectification transistor, a synchronous rectification control circuit, a feedback circuit, and a cable loss compensation circuit. The power conversion circuit performs power conversion on an input voltage to generate an output voltage and provides the output voltage to a load. The synchronous rectification transistor is coupled in series to a current path on a secondary side of the power conversion circuit and switches a conduction state according to a synchronous rectification control signal. The synchronous rectification control circuit is coupled to the synchronous rectification transistor to generate the synchronous rectification control signal so as to control the switching of the synchronous rectification transistor. The feedback circuit is coupled to the power conversion circuit to generate an output indication current associated with the output voltage. The cable loss compensation circuit is coupled to the synchronous rectification control circuit and the feedback circuit to draw a compensation current from the feedback circuit according to the synchronous rectification control signal, so as to compensate for the output voltage based on a sum of the compensation current and the output indication current.

Based on the above, the invention provides a power conversion apparatus, which includes a cable loss compensation circuit that uses a synchronous rectification control signal as a basis for cable loss compensation. The cable loss compensation circuit generates a compensation current corresponding to the value of an output current according to the synchronous rectification control signal and accordingly compensates for the cable loss of the output voltage during overload. No matter the power conversion apparatus is in DCM or CCM, the waveform of the synchronous rectification control signal is able to indicate the value of the output current. Therefore, the power conversion apparatus of the embodiments of the invention performs cable loss compensation effectively in both DCM and CCM, and is not restricted by the operation mode of the power conversion apparatus. In addition, because the power conversion apparatus of the embodiments of the invention directly detects the output current without an additional current detection current, the overall power consumption of the power conversion apparatus is reduced.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
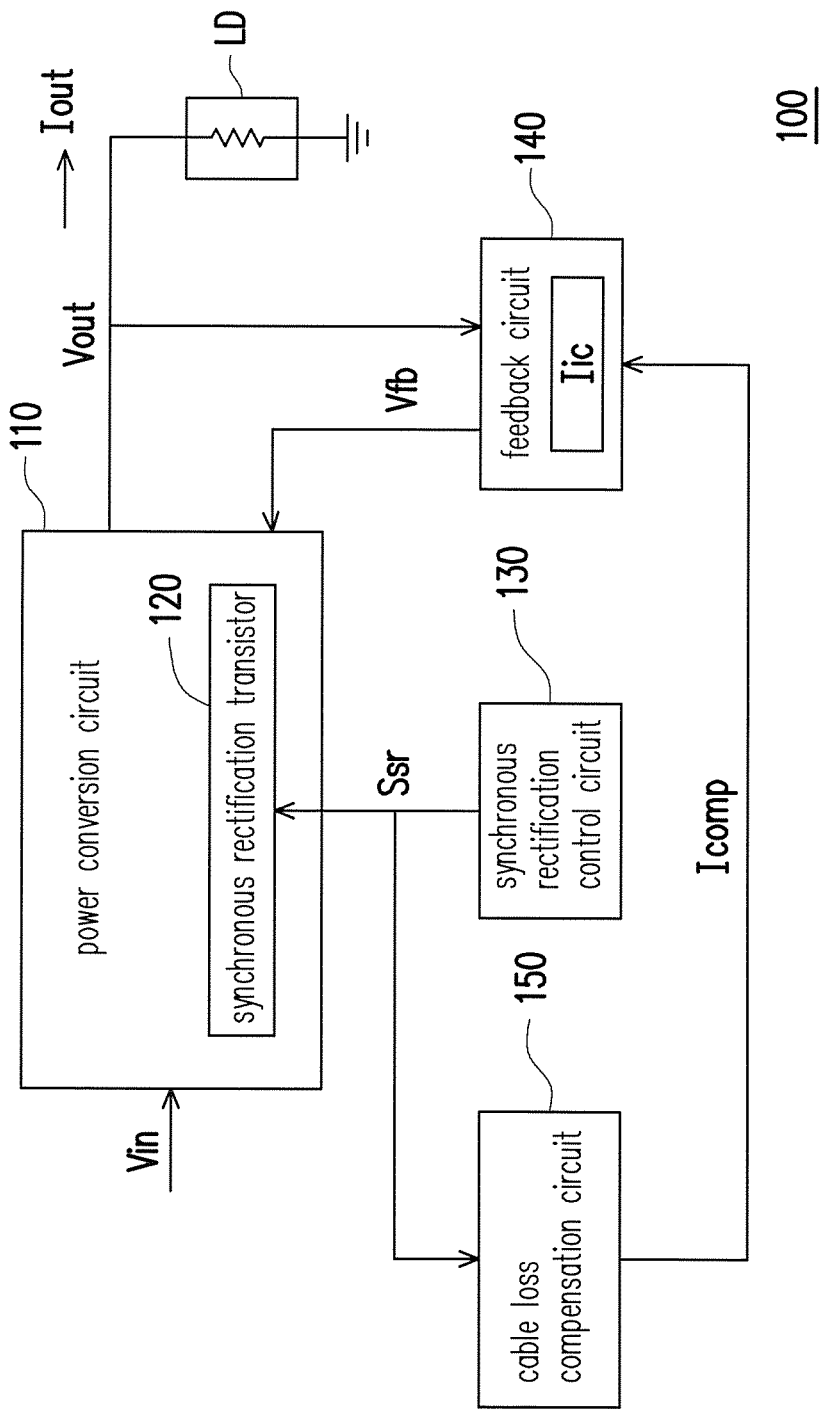
FIG. 1 is a block diagram of a power conversion apparatus according to an embodiment of the invention.

In order to make this disclosure more comprehensible, several embodiments are described below as examples of implementation of this disclosure. Moreover, elements/components/steps with the same reference numerals are used to represent the same or similar parts in the figures and embodiments.

FIG. 1 is a schematic diagram of a power conversion apparatus according to an embodiment of the invention. Referring to FIG. 1, a power conversion apparatus 100 of this embodiment includes a power conversion circuit 110, a synchronous rectification transistor 120, a synchronous rectification control circuit 130, a feedback circuit 140, and a cable loss compensation circuit 150.

The power conversion circuit 110 is a flyback converter that has a synchronous rectification function, for example. In this embodiment, the power conversion circuit 110 is configured to receive an input voltage Vin and performs power conversion on the input voltage Vin to generate a DC output voltage Vout, wherein the output voltage Vout is provided to a load LD. The load LD may be any electronic device, and the invention is not intended to limit the type of the load LD.

The synchronous rectification transistor 120 is coupled in series to a current path on a secondary side of the power conversion circuit 110 (will be specifically illustrated by the circuit configuration in the following embodiment) and is controlled by a synchronous rectification control signal Ssr generated by the synchronous rectification control circuit 130 to switch a conduction state.

The synchronous rectification control circuit 130 is coupled to the synchronous rectification transistor 120 and is coordinated with a power switch (not shown) of the power conversion circuit 110 to switch timing to provide the corresponding synchronous rectification control signal Ssr for controlling the switching of the synchronous rectification transistor 120, such that a secondary power is provided to the load LD.

The feedback circuit 140 is coupled to the power conversion circuit 110 to sample the output voltage Vout on an output end on the secondary side and accordingly generate an output indication current Iic associated with the output voltage Vout. In addition, the feedback circuit 140 further couples the sampled voltage information as a feedback voltage Vfb back to a primary side to be provided to the power conversion circuit 110 as a basis for control.

The cable loss compensation circuit 150 is coupled to the synchronous rectification control circuit 130 and the feedback circuit 140 to draw a corresponding compensation circuit Icomp from the feedback circuit 140 according to the synchronous rectification control signal Ssr generated by the synchronous rectification control circuit 130. Accordingly, in addition to the voltage originally built based on the output indication current Iic in the feedback circuit 140, the cable loss compensation circuit 150 builds an additional voltage in the feedback circuit 140 based on the drew compensation current Icomp to compensate for the output voltage Vout. In other words, the cable loss compensation circuit 150 compensates for the output voltage Vout based on a sum of the compensation current Icomp and the output indication current Iic.

Specifically, in the synchronous rectification control circuit 130 used in this embodiment, the generated synchronous rectification control signal Ssr has a characteristic that a waveform changes according to the value of the output current Iout/change of the load no matter the power conversion apparatus 100 operates in a continuous conduction mode (CCM) or a discontinuous conduction mode (DCM). The cable loss compensation circuit 150 of this embodiment mainly uses the aforementioned characteristic as a basis for determining the operation state of the power conversion circuit 110, and generates the compensation current Icomp that is associated with the value of the output current/change of the load LD based on the synchronous rectification control signal Ssr to compensate for a voltage drop of the output voltage Vout in the case of a great current/overload.

More specifically, as compared with the method of performing cable loss compensation according to the turn-off period of the power switch, the cable loss compensation mechanism of this embodiment is applicable in both DCM and CCM and is not restricted by the operation mode of the power conversion circuit 110. Furthermore, in comparison with the method of performing cable loss compensation by directly detecting the output current Iout, the cable loss compensation mechanism of this embodiment is not required to directly detect the output current Iout and therefore the power consumption is reduced.

Figure 2:
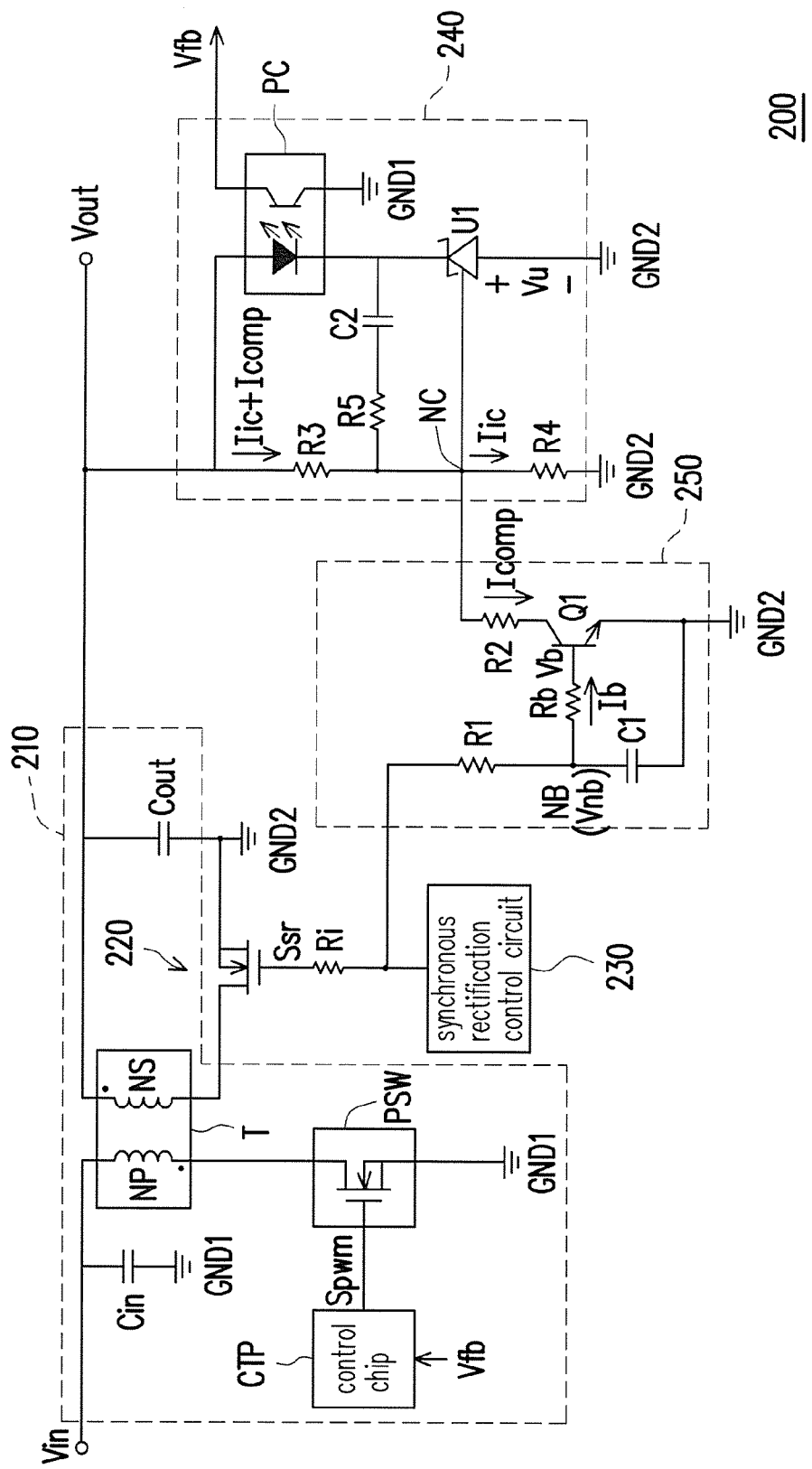
FIG. 2 is a circuit diagram of a power conversion apparatus according to an embodiment of the invention.

Hereinafter, the cable loss compensation mechanism of this embodiment is described with reference to the specific circuit illustrated in FIG. 2. FIG. 2 is a circuit diagram of the power conversion apparatus according to an embodiment of the invention.

Referring to FIG. 2, a power conversion apparatus 200 of this embodiment includes a power conversion circuit 210, a synchronous rectification transistor 220, a synchronous rectification control circuit 230, a feedback circuit 240, and a cable loss compensation circuit 250. The power conversion circuit 210 includes a transformer T, an input capacitor Cin, a power switch PSW, a control chip CTP, and an output capacitor Cout. The cable loss compensation circuit 250 includes resistors R1, R2, and base resistor Rb, a capacitor C1, and a transistor Q1. The feedback circuit 240 includes resistors R3, R4, and R5, a capacitor C2, a stabilizer U1, and an optocoupler PC.

In the power conversion circuit 210, the transformer T has a primary winding Np and a secondary winding Ns. A primary circuit (a side of the primary winding Np) uses a ground terminal GND1 as a voltage reference point and a secondary circuit (a side of the secondary winding Ns) uses a ground terminal GND2 as a voltage reference point. The ground terminal GND1 and the ground terminal GND2 may be the same or different ground surfaces, and the invention is not intended to limit whether the ground terminal GND1 and the ground terminal GND2 are the same or different.

A common-polarity terminal (marked by a dot) of the primary winding Np of the transformer T is coupled to the power switch PSW and an opposite-polarity terminal (not marked by a dot) of the primary winding Np of the transformer T is used to receive the input voltage Vin. A common-polarity terminal of the secondary winding Ns of the transformer T is coupled to a first terminal of the output capacitor Cout and an opposite-polarity terminal of the secondary winding Ns of the transformer T is coupled to a second terminal of the output capacitor Cout and the ground terminal GND2 on the secondary side via the synchronous rectification transistor 220.

The control chip CTP is coupled to a control terminal of the power switch PSW, so as to provide a pulse width modulation signal Spwm to control the switching of the power switch PSW. The power switch PSW described here is an NMOS, for example. A first terminal (a drain here, but the invention is not limited thereto; it may be determined according to the type of the power switch PSW) of the power switch PSW is coupled to the common-polarity terminal of the primary winding Np of the transformer T, a second terminal (a source here) of the power switch PSW is coupled to the ground terminal GND1, and a control terminal (a gate here) of the power switch PSW is used to receive the pulse width modulation signal Spwm from the control chip 120.

A first terminal of the input capacitor Cin is coupled to the opposite-polarity terminal of the primary winding Np and a second terminal of the input capacitor Cin is coupled to the ground terminal GND1. A first terminal of the output capacitor Cout is coupled to the common-polarity terminal of the second winding Ns and the second terminal of the output capacitor Cout is coupled to the ground terminal GND2.

The synchronous rectification transistor 220 described here is an NMOS, for example. A first terminal (a drain here, but the invention is not limited thereto; it may be determined according to the type of the synchronous rectification transistor 220) of the synchronous rectification transistor 220 is coupled to the second terminal of the output capacitor Cout, a second terminal (a source here) of the synchronous rectification transistor 220 is coupled to the opposite-polarity terminal of the secondary winding Ns of the transformer T, and a control terminal (a gate here) of the synchronous rectification transistor 220 is used to receive the synchronous rectification control signal Ssr from the synchronous rectification control circuit 230. In other words, the first terminal and the second terminal of the synchronous rectification transistor 220 are coupled in series to the current path of the secondary winding Ns. Thus, the conduction state of the synchronous rectification transistor 220 determines whether the current path on the secondary side is off.

In the feedback circuit 240, a first terminal of the resistor R3 is coupled to the first terminal of the output capacitor Cout. A first terminal of the resistor R4 is coupled to a second terminal of the resistor R3 and a second terminal of the resistor R4 is coupled to the ground terminal GND2. A first terminal of the resistor R5 is coupled to the second terminal of the resistor R3 and the first terminal of the resistor R4. A first terminal of the capacitor C2 is coupled to a second terminal of the resistor R5.

A first terminal of the optocoupler PC on an input side is coupled to the first terminal of the resistor R3 and a second terminal of the optocoupler PC on the input side is coupled to the second terminal of the capacitor C2. A first terminal of the optocoupler PC on an output side outputs the feedback voltage Vfb and a second terminal of the optocoupler PC on the output side is coupled to the ground terminal GND1.

A first terminal of the stabilizer U1 is coupled to the second terminal of the capacitor C2 and the second terminal of the optocoupler PC on the input side, a second terminal of the stabilizer U1 is coupled to the ground terminal GND2, and a stabilizing terminal of the stabilizer U1 is coupled to the second terminal of the resistor R3 and the first terminal (i.e. node NC) of the resistor R4 and performs a stabilizing operation on the voltage on the node NC.

The optocoupler PC is coordinated with the operation of the stabilizer U1 and generates the feedback voltage Vfb associated with the value of the output voltage Vout on the output side thereof based on the DC output voltage Vout and provides the feedback voltage Vfb to the control chip CTP, such that the control chip CTP uses the feedback voltage Vfb as a basis for controlling the power switch PSW.

In the cable loss compensation circuit 250, a first terminal of the resistor R1 is coupled to a signal output terminal of the synchronous rectification control circuit 230, so as to receive the synchronous rectification control signal Ssr. A first terminal of the resistor R2 is coupled to the node NC (i.e. the first terminal of the resistor R4 in the feedback circuit 240). A first terminal of the capacitor C1 is coupled to a second terminal of the resistor R1, and a second terminal of the capacitor C1 is coupled to the ground terminal GND2. The transistor Q1 described here is a BJT, for example. A first terminal (a collector here) of the transistor Q is coupled to a second terminal of the resistor R2, a second terminal (an emitter here) of the transistor Q is coupled to the ground terminal GND2, and a base of the transistor Q1 is coupled to the second terminal of the resistor R1 and the first terminal of the capacitor C1.

To be more specific, when the power conversion apparatus 200 operates normally, the control chip CTP generates the pulse width modulation signal Spwm in response to a power supply demand of the load, so as to control the operation of the power conversion circuit 210. Under this condition, when the power switch PSW is turned on in response to the pulse width modulation signal Spwm generated by the control chip CTP, the input voltage Vin bridges over the primary winding Np of the transformer T and causes an inductive current of the primary winding Np of the transformer T to increase linearly to store energy. In the meantime, the synchronous rectification control circuit 230 generates the disabling synchronous rectification control signal Ssr on the side of the secondary winding Ns to turn off the synchronous rectification transistor 220. Due to the blocking of the turned off synchronous rectification transistor 220, no current passes through the secondary winding Ns of the transformer T.

When the power switch PSW is turned off in response to the pulse width modulation signal Spwm generated by the control chip CTP, based on the Lenz's law, the energy stored by the primary winding Np of the transformer T is transferred to the secondary winding Ns of the transformer T. In the meantime, the synchronous rectification control circuit 230 generates the enabling synchronous rectification control signal Ssr on the side of the secondary winding Ns to turn on the synchronous rectification transistor 220. Because the synchronous rectification transistor 220 is turned on, the energy transferred to the secondary winding Ns of the transformer T charges the output capacitor Cout and supplies the output voltage Vout to the load (electronic device).

It is known from the above that, by performing the operation of alternately turning on and off the power switch PSW based on the pulse width modulation signal Spwm generated by the control chip CTP, the power conversion apparatus 200 is able to continuously supply the output voltage Vout.

On the other hand, in terms of the operation of the cable loss compensation circuit 250, if the synchronous rectification control signal Ssr s enabling, the capacitor C1 performs charging in response to the voltage level of the synchronous rectification control signal Ssr, such that the voltage Vnb on the node NB gradually increases during the enabling period of the synchronous rectification control signal Ssr; and when the synchronous rectification control signal Ssr is switched to be disabling, the capacitor C1 is maintained at a specific voltage value.

When a voltage across the base and the emitter of the transistor Q1 exceeds a barrier voltage, the transistor Q1 generates an emitting current (i.e. the compensation current Icomp passing through the resistor R2) that has a multiple relationship with a base current. When the compensation current Icomp is not yet generated, the output voltage Vout is equal to the output indication current Iic multiplied by the resistance value of the resistor R3 (i.e. voltage across the resistor R3) plus the stabilizing voltage Vu (i.e. Vout=Iic*R3+Vu). When the compensation current Icomp has been generated, since the transistor Q1 additionally draws a current from the node Nc, the current that passes through the resistor R3 becomes the output indication current Iic plus the compensation current Icomp. In other words, when the compensation current Icomp has been generated, the output voltage Vout is equal to the sum of the output indication current Iic and the compensation current Icomp multiplied by the resistance value of the resistor R3 plus the stabilizing voltage Vu (i.e. Vout=(Iic+Icomp)*R3+Vu).

According to the above equation, when the cable loss compensation circuit 250 generates the compensation current Icomp in response to the synchronous rectification control signal Ssr, the output voltage Vout is raised so as to achieve the effect of compensating for the output voltage Vout. In addition, the value of the compensation current Icomp is determined by the voltage Vnb on the node NB, and the level of the voltage Vnb is positively correlated with a product of the voltage level of the synchronous rectification control signal Ssr and the enabling time, wherein the product of the voltage level of the synchronous rectification control signal Ssr and the enabling time indicates the value of the output current Iout. Therefore, the cable loss compensation circuit 250 of this embodiment is able to achieve the effect of providing a corresponding compensation value according to the value of the output current Iout/change of the load to compensate for the output voltage Vout.

Hereinafter, FIG. 3 and FIG. 4 respectively illustrate the signal timings when the power conversion apparatus 200 of this embodiment operates in the DCM and CCM.

Figure 3:
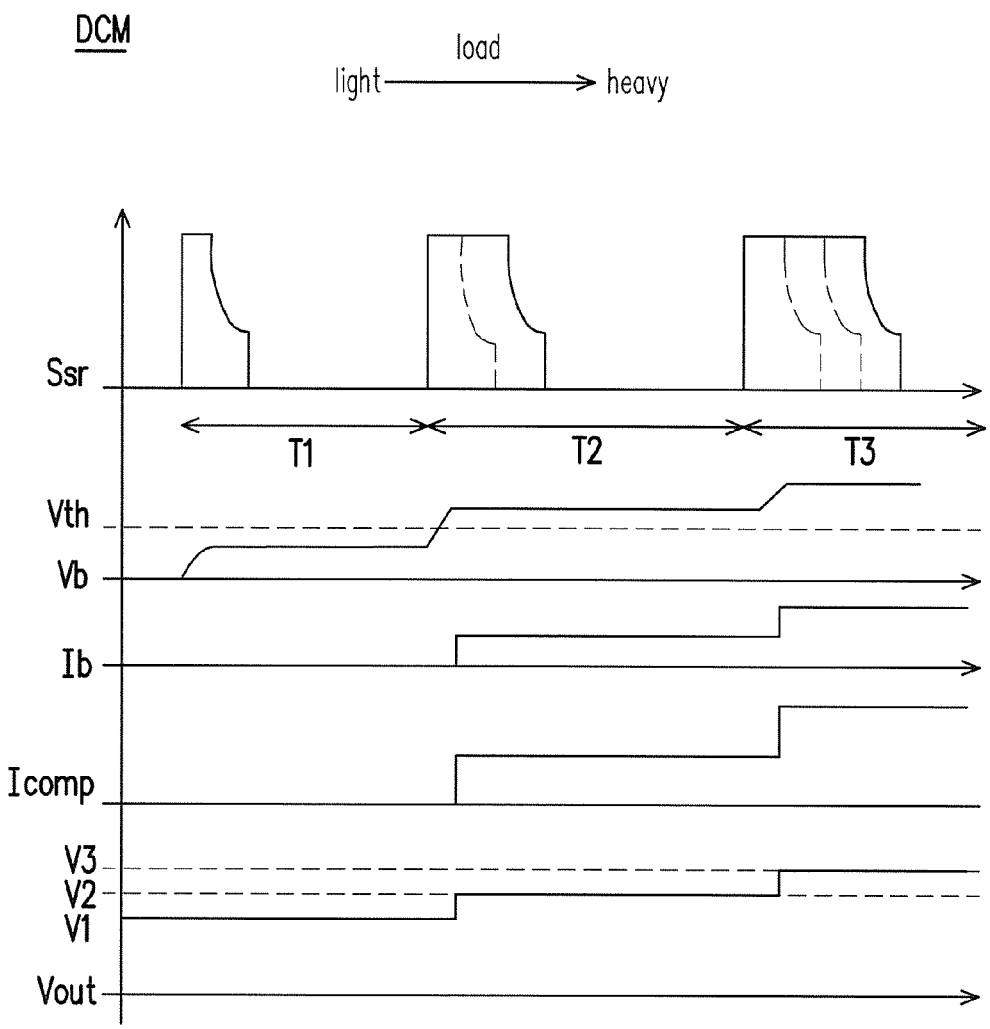
FIG. 3 is a signal timing diagram of a power conversion apparatus according to an embodiment of the invention.

The signal timing of the power conversion apparatus 200 that operates in the DCM is shown in FIG. 3. Referring to FIG. 2 and FIG. 3, since the turn-off period of the power switch PSW is not fixed under DCM, the enabling period of the synchronous rectification control signal Ssr varies according to the turn-off period of the power switch PSW. Moreover, the signal waveform of the synchronous rectification control signal Ssr has a characteristic that the signal decays after a specific period. In other words, under DCM, an enabling waveform area of the synchronous rectification control signal Ssr is positively correlated with the output current Tout.

In this embodiment, the operation of the power conversion apparatus 200 under different loads is described based on a condition that the load gradually increases. In a period T1, the load is light and the enabling period of the synchronous rectification control signal Ssr is shorter. Consequently, the base voltage Vb of the transistor Q1 does not exceed the barrier voltage Vth in the period T1. Therefore, the cable loss compensation circuit 250 does not compensate for the output voltage Vout for the power conversion circuit 210 in the period T1. Accordingly, the voltage value of the output voltage Vout is approximately maintained at V1 in the period T1.

When the load increases, like the operation status in a period T2, the enabling period of the synchronous rectification control signal Ssr increases correspondingly. Because the capacitor C1 continues to be charged in the enabling period of the synchronous rectification control signal Ssr, the base voltage Vb of the transistor Q1 exceeds the barrier voltage Vth. In this case, a voltage difference between the voltage Vnb and the base voltage Vb builds a base current Ib on the base resistor Rb, such that the compensation current Icomp is generated accordingly (having a β multiple relationship with the base current Ib). Due to the compensation current Icomp, the output voltage Vout is raised up to a voltage value V2, so as to compensate for the voltage drop that occurs as the load increases.

Likewise, in a subsequent period T3, as the output load continues increasing, the base current Ib rises with the increase of the enabling period area of the synchronous rectification control signal Ssr, which causes the compensation current Icomp to increase as well. Consequently, the output voltage Vout is further raised up to a voltage value V3 from the voltage value V2 to compensate for the voltage drop that occurs as the load increases.

Figure 4:
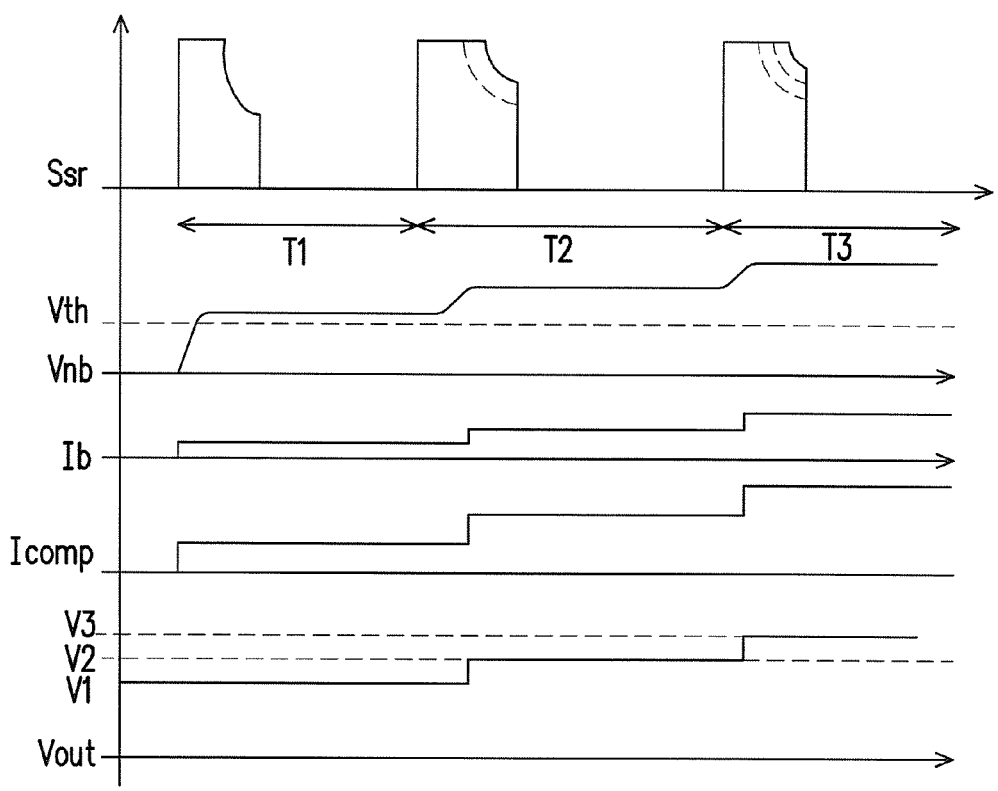
FIG. 4 is a signal timing diagram of a power conversion apparatus according to another embodiment of the invention.

The signal timing of the power conversion apparatus 200 that operates in the CCM is shown in FIG. 4. Referring to FIG. 2 and FIG. 4, since the turn-off period of the power switch PSW is fixed under the CCM, the enabling period of the synchronous rectification control signal Ssr is also fixed. However, the synchronous rectification control signal Ssr decays later when the output current Iout is relatively great; and the synchronous rectification control signal Ssr decays earlier when the output current Tout is relatively small. In other words, in the CCM, the enabling waveform area of the synchronous rectification control signal Ssr is positively correlated with the value of the output current Iout as well.

In this embodiment, the operation of the power conversion apparatus 200 under different loads is described also based on the condition that the load gradually increases. In the period T1, the load is light and the voltage level of the synchronous rectification control signal Ssr decays earlier. Consequently, the voltage Vnb on the node NB has a lower voltage level in the period T1. Therefore, the compensation current Icomp generated by the cable loss compensation circuit 250 in the period T1 is smaller, and the voltage value of the output voltage Vout is approximately maintained at V1 in the period T1.

When the load increases, like the operation status in the period T2, the voltage level of the synchronous rectification control signal Ssr decays later, which causes the capacitor C1 to charge at a high voltage level for a longer period of time. Thus, the voltage level of the voltage Vnb on the node NB rises. In this case, since the base current Ib increases with the increase of the voltage Vnb, and the value of the compensation current Icomp has a multiple relationship with the base current Ib, the output voltage Vout is raised from the voltage value V1 up to the voltage value V2 due to the compensation current Icomp, so as to compensate for the voltage drop that occurs as the load increases.

Likewise, in the subsequent period T3, as the output load continues increasing, the base current Ib rises with the increase of the enabling period area of the synchronous rectification control signal Ssr, which causes the compensation current Icomp to increase as well. Consequently, the output voltage Vout is further raised up to the voltage value V3 from the voltage value V2 to compensate for the voltage drop that occurs as the load increases.

To conclude the above, the invention provides a power conversion apparatus, which includes a cable loss compensation circuit that uses a synchronous rectification control signal as a basis for cable loss compensation. The cable loss compensation circuit generates a compensation current corresponding to the value of an output current according to the synchronous rectification control signal and accordingly compensates for the cable loss of the output voltage during overload. No matter the power conversion apparatus is in DCM or CCM, the waveform of the synchronous rectification control signal is able to indicate the value of the output current. Therefore, the power conversion apparatus of the embodiments of the invention performs cable loss compensation effectively in both DCM and CCM, and is not restricted by the operation mode of the power conversion apparatus. In addition, because the power conversion apparatus of the embodiments of the invention directly detects the output current without an additional current detection current, the overall power consumption of the power conversion apparatus is reduced.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A power conversion apparatus, comprising:
   a power conversion circuit performing power conversion on an input voltage to generate an output voltage and providing the output voltage to a load;
   a synchronous rectification transistor coupled in series to a current path on a secondary side of the power conversion circuit and controlled by a synchronous rectification control signal to switch a conduction state;
   a synchronous rectification control circuit coupled to the synchronous rectification transistor to generate the synchronous rectification control signal to control switching of the synchronous rectification transistor;
   a feedback circuit coupled to the power conversion circuit to generate an output indication current associated with the output voltage; and
   a cable loss compensation circuit coupled to the synchronous rectification control circuit and the feedback circuit to draw a compensation current from the feedback circuit according to the synchronous rectification control signal to compensate for the output voltage based on a sum of the compensation current and the output indication current.

2. The power conversion apparatus according to claim 1, wherein a waveform of the synchronous rectification control signal changes according to an output current generated by the power conversion circuit.

3. The power conversion apparatus according to claim 1, wherein the compensation current is positively correlated with a product of an enabling time and a voltage level of the synchronous rectification control signal.

4. The power conversion apparatus according to claim 1, wherein the cable loss compensation circuit comprises:
   a first resistor having a first terminal coupled to the synchronous rectification control circuit to receive the synchronous rectification control signal;
   a second resistor having a first terminal coupled to the feedback circuit;
   a first capacitor having a first terminal coupled to a second terminal of the first resistor and a second terminal coupled to a ground terminal on the secondary side;
   a first transistor having a first terminal coupled to a second terminal of the second resistor and a second terminal coupled to the ground terminal; and
   a base resistor having a first terminal coupled to the control terminal of the first transistor and a second terminal coupled to the first terminal of the first capacitor.

5. The power conversion apparatus according to claim 4, wherein a current passing through the second resistor is the compensation current.

6. The power conversion apparatus according to claim 4, wherein the power conversion circuit comprises:
   a transformer having a primary winding and a secondary winding, wherein an opposite-polarity terminal of the primary winding receives the input voltage;
   an input capacitor having a first terminal coupled to the opposite-polarity terminal of the primary winding and a second terminal coupled to a ground terminal on a primary side;
   a power switch having a first terminal coupled to a common-polarity terminal of the primary winding and a second terminal coupled to the ground terminal on the primary side;
   a control chip coupled to a control terminal of the power switch to provide a pulse width modulation signal to control switching of the power switch; and
   an output capacitor having a first terminal coupled to a common-polarity terminal of the second winding and a second terminal coupled to the ground terminal on the secondary side.

7. The power conversion apparatus according to claim 6, wherein a first terminal of the synchronous rectification transistor is coupled to the second terminal of the output capacitor, a second terminal of the synchronous rectification transistor is coupled to an opposite-polarity terminal of the secondary winding, and a control terminal of the synchronous rectification transistor is coupled to the synchronous rectification control circuit.

8. The power conversion apparatus according to claim 6, wherein the feedback circuit comprises:
   a third resistor having a first terminal coupled to the first terminal of the output capacitor and a second terminal coupled to the first terminal of the second resistor;
   a fourth resistor having a first terminal coupled to the first terminal of the second resistor and the second terminal of the third resistor, and a second terminal coupled to the ground terminal on the secondary side;
   a fifth resistor having a first terminal coupled to the second terminal of the third resistor and the first terminal of the fourth resistor;
   a second capacitor having a first terminal coupled to the second terminal of the fifth terminal; and
   a stabilizer having a first terminal coupled to a second terminal of the second capacitor, a second terminal coupled to the ground terminal on the secondary side, and a stabilizing terminal coupled to the second terminal of the third resistor and the first terminal of the fourth resistor.

9. The power conversion apparatus according to claim 8, wherein a current passing through the fourth resistor is the output indication current and a current passing through the third resistor is the sum of the output indication current and the compensation current.

* * * * *